US008396482B1

(12) United States Patent
Kalliojarvi

(10) Patent No.: US 8,396,482 B1
(45) Date of Patent: Mar. 12, 2013

(54) LOCATION OF A MOBILE STATION IN A TELECOMMUNICATION SYSTEM

(75) Inventor: Kari Kalliojarvi, Veikkola (FI)

(73) Assignee: Nokia Corporation, Espoo (FI)

( * ) Notice: Subject to any disclaimer, the term of this patent is extended or adjusted under 35 U.S.C. 154(b) by 980 days.

(21) Appl. No.: 10/019,705

(22) PCT Filed: Jun. 30, 2000

(86) PCT No.: PCT/EP00/06170
§ 371 (c)(1),
(2), (4) Date: May 13, 2002

(87) PCT Pub. No.: WO01/03462
PCT Pub. Date: Jan. 11, 2001

(30) Foreign Application Priority Data

Jul. 6, 1999  (GB) .................................. 9915841.2

(51) Int. Cl.
*H04W 24/00*  (2009.01)
(52) U.S. Cl. ................... 455/456.1; 455/456.2; 455/524
(58) Field of Classification Search .............. 455/404.2, 455/435.1, 433, 456.1, 456.2, 456.3, 457, 455/95, 513, 115.3, 456, 69, 63, 522, 443, 455/501, 517, 446, 524, 67.6, 466, 67.1, 455/562, 440; 370/509, 516, 518; 342/457, 342/456, 465, 357.03, 357.1
See application file for complete search history.

(56) References Cited

U.S. PATENT DOCUMENTS

| | | | | |
|---|---|---|---|---|
| 5,299,132 A | * | 3/1994 | Wortham | ...................... 455/457 |
| 5,608,410 A | | 3/1997 | Stilp et al. | ..................... 342/387 |
| 5,732,354 A | * | 3/1998 | MacDonald | ............... 455/456.2 |
| 5,781,864 A | * | 7/1998 | Reudink | ........................ 455/560 |
| 5,884,215 A | | 3/1999 | Birchler et al. | ............... 701/207 |
| 5,913,170 A | * | 6/1999 | Wortham | ....................... 455/457 |
| 5,926,133 A | * | 7/1999 | Green, Jr. | ....................... 342/363 |
| 5,974,329 A | * | 10/1999 | Wylie et al. | ................ 455/456.1 |
| 6,026,304 A | * | 2/2000 | Hilsenrath et al. | .......... 455/456.2 |
| 6,122,512 A | * | 9/2000 | Bodin | ........................... 455/440 |
| 6,173,186 B1 | * | 1/2001 | Dalley | .......................... 455/446 |
| 6,195,556 B1 | * | 2/2001 | Reudink et al. | ............ 455/456.2 |

(Continued)

FOREIGN PATENT DOCUMENTS

| | | |
|---|---|---|
| EP | 0705046 | 4/1996 |
| JP | 08-033028 | 2/1996 |
| JP | 08-179028 | 7/1996 |
| JP | 11-252632 | 9/1999 |
| WO | 9810307 | 3/1998 |
| WO | WO 98/14018 | 4/1998 |

OTHER PUBLICATIONS

Patent Abstracts of Japan, Publication No. 11-252632, "Mobile Communication System and Method for Detecting Position of Mobile Radio Terminal", N. Kiyoshi.
Patent Abstracts of Japan, Publication No. 08-179028, "Present Position Detection Service System for Mobile Station in Cellular Telephone", I. Hiroyuki.
Patent Abstracts of Japan, Publication No. 08-033028, "Mobile Station Position Reporting Method for Mobile Object Communication", T. Mutsuya.

*Primary Examiner* — Ajit Patel
*Assistant Examiner* — Julio Perez
(74) *Attorney, Agent, or Firm* — Locke Lord LLP

(57) ABSTRACT

Means and a method for determination of a distance between a transmitting station and a receiving station is disclosed. In the method a characteristic parameter is determined for the radio propagation environment of the receiving station. At least one feature of a signal that has been received at the receiving station is measured, said feature being such that it can be used for the determination of the distance between the stations. The distance is then computed based on said measured signal feature and the characteristic parameter.

19 Claims, 5 Drawing Sheets

U.S. PATENT DOCUMENTS

| | | | |
|---|---|---|---|
| 6,236,849 B1 * | 5/2001 | Reudink et al. | 455/342 |
| 6,275,705 B1 * | 8/2001 | Drane et al. | 455/456.2 |
| 6,438,380 B1 * | 8/2002 | Bi et al. | 455/456.1 |
| 6,477,380 B1 * | 11/2002 | Uehara et al. | 455/456.1 |
| 6,741,863 B1 * | 5/2004 | Chiang et al. | 455/456.1 |
| 2002/0005804 A1 * | 1/2002 | Suprunov | 342/457 |
| 2002/0050944 A1 * | 5/2002 | Sheynblat et al. | 342/357.06 |
| 2003/0134648 A1 * | 7/2003 | Reed et al. | 455/456 |
| 2004/0023664 A1 * | 2/2004 | Mirouze et al. | 455/456.1 |
| 2004/0104841 A1 * | 6/2004 | Syrjarinne | 342/357.13 |

* cited by examiner

LOCATION OF A MOBILE STATION IN A TELECOMMUNICATION SYSTEM

FIELD OF THE INVENTION

The present invention relates to a method and arrangement for providing information relating to location of a station. More particularly, but not exclusively, the invention relates to determination of the distance between a transmitting station and a receiving station.

BACKGROUND OF THE INVENTION

A cellular telecommunications system is based around cells or similar radio coverage areas. Examples of cellular telecommunications systems include standards such as the GSM (Global System for Mobile communications) or various GSM based systems (such as GPRS: General Packet Radio Service), AMPS (American Mobile Phone System) or DAMPS (Digital AMPS) or the proposed WCDMA (Wideband Code Division Multiple Access) or UMTS (Universal Mobile Telecommunications System) etc. In general, a cell coverage area or a base station coverage area of a cellular telecommunications system can be defined as a certain geographically limited area covered by one or several base transceiver stations (BTS) serving mobile stations (MS) via an air or radio interface and usually connected to a base station subsystem (BSS). Each of the coverage areas can be controlled by an appropriate controller apparatus. For example, in the proposed WCDMA standard each cell is controlled by at least one radio network controller (RNC) and in the GSM standard each cell is controlled by at least one mobile switching center (MSC). The controller is connected further to a gateway or linking apparatus, such as a serving GPRS support node (SGSN) or gateway mobile switching center (GSMC), linking the cell to the other parts of the communication system. Several cells cover a larger area, and form together the coverage area of a cellular telecommunications network.

The mobile station (MS) or user equipment (UE) within one of the cells of the telecommunications system is correspondingly controlled by the controller of the given cell. Even though the MS may be controlled by only one controller at time, it may also be connected simultaneously to several controllers, e.g. when the cells overlap or in so called soft handoff mode, where the MS may be in communication with two base stations, and those base stations may be connected to different controllers. From these one controller can be defined as the serving (main) controller whereas the others act as secondary controllers.

In the context of the location of a mobile station, and thus the user thereof, the use of cells or similar geographically limited radio coverage areas and associated controllers facilitates the cellular telecommunications system to produce at least a rough location information estimate concerning the current location of an individual mobile station. More particularly, the cellular telecommunications system is always aware of the current location of such mobile stations which are communicating with at least one of the base stations of the system and thus registered within at least one of the controllers of the system (i.e. are located within the area of one cell of the system). This information is available even when the mobile station is located within a coverage area of a visited or "foreign" network, as the visited network is capable of transmitting the location of the mobile station back to the home location register, e.g. for the purposes of routing and charging.

This location information could also be used for other purposes than solely for call processing (routing, charging, resource allocation etc.). There are several possible commercial and non-commercial applications which could use this location information would it be readily available. These possible applications include different local advertisement and information distribution schemes (e.g. transmissions of information directed to those mobile users only who are currently within a certain area), area related WWW-pages (such as time tables, local restaurant, shop or hotel guides, maps local advertisements etc.) for the users of mobile data processing devices, location of those who have called to an emergency number and tracking of mobile users by anyone who wishes to receive this information and is legally entitled to obtain it. An application requiring precise and real-time location information of the movement of a mobile station is a mobile station movement prediction feature that could be utilized, for example, in dynamic network resource allocation. There are various other possible uses of the location information and applications which could use the location information, and in general it can be said that all such applications which need a location information concerning the geographical location of the mobile station could find the location information provided by means of a telecommunications system useful. The usability of this location information could even be substantially increased by improving the accuracy of the location information provided by the telecommunications system.

There is a proposal for a location service feature provided by means of a cellular telecommunications network which could provide the last known location of a mobile station together with a time-stamp. This feature can be provided by a separate network element or server which receives the information from the various controllers of the system. For example, in the GSM this information can be obtained from a Visitor Location Register (VLR) of the visited MSC or the Home location Register (HLR) of the home network. This proposal as such would give the accuracy of one base station or cell, i.e. it would indicate that the mobile station is (or at least was) within the coverage area of a certain base station or cell. When the last coverage area within which the mobile station is positioned is known by the system, an appropriate processor facility may then define the rough geographical location of the mobile station on the basis of the radio coverage area information.

The accuracy of the location determination can be improved by utilizing results of measurements which define the travel time (or travel time differences) of the radio signal sent by the mobile station to the base station. The measurements are preferably accomplished by at least three different base stations covering the area in which the mobile station is currently located. The measurement by each of the three base stations gives the distance (range) between the base station and the mobile station or distance difference (range difference) between the mobile station and two base stations. Each of the range measurements generates a circle centered at the measuring base station. Each of the range difference measurement creates a hyperbola (not a circle as in the range measurements). Thus if range differences are used in the location calculation, the intersections of the hyperbolas are searched for. In an ideal case and in the absence of any measurement error, the intersection of the three circles by the three base stations or the hyperbolas would unambiguously determine the location of the mobile station.

However, the direct radio propagation path between the transmitting and receiving stations may be intermittently or, quite possibly, continuously blocked. This non-line of sight (NLOS) phenomenon is known to be a major source of error in position location because it causes the mobile station to appear further away from the base station than it actually is. Thus, even though the distance measurement results derived from several base stations are utilised the location determination may still give an incorrect location. This is especially the case in a dense urban environment in which several obstacles may cause the mobile station to repeatedly and/or continuously lose the direct line of sight with one or several of the base stations. This causes an increased path length the radio signal has to travel between the transmitting station and the receiving station in order to circumvent all these obstructing elements. Due to reflection and diffraction, the first arriving wave may travel excess path lengths on the order of hundreds of meters if the direct path is blocked.

SUMMARY OF THE INVENTION

It is an aim of the embodiments of the invention to address one or more of these problems.

According to one aspect the present invention provides a method of determining a distance between a transmitting station and a receiving station comprising the steps of:
  determining a characteristic parameter for the radio propagation environment of the receiving station;
  measuring at least one feature of a signal received from the transmitting station at the receiving station, said feature being such that it can be used for determination of the distance between the transmitting station and the receiving station; and
  computing the distance between the transmitting station and the receiving station using said measured signal feature and the characteristic parameter.

According to another aspect, the present invention provides an arrangement for determining the distance between a transmitting and receiving station, comprising:
  storage means for storing a characteristic parameter describing the characteristics of the radio propagation environment of the receiving station;
  measurement means for measuring a feature of a signal transmitted from the transmitting station to the receiving station, said feature facilitating determination of the distance between the transmitting station and the receiving station;
  a controller for receiving the outcome of said measurement and for defining the distance between the transmitting station and the receiving station on the basis of the outcome of the measurement and the characteristic parameter.

According to a further aspect, the present invention provides a location server for use in a telecommunications system for provision of location data of a mobile station having a radio connection with at least one base station of the telecommunications system, comprising:
  means for receiving measurement data from the telecommunications system concerning a feature of the connection between the mobile station and the base station, said feature facilitating determination of the distance between the mobile station and the base station;
  storage means for storing a characteristic parameter describing the radio propagation environment of the base station;
  control means for defining the distance between the mobile station and the base station on the basis of the received measurement data and the characteristic parameter.

According to a still further aspect, the present invention provides an arrangement in a telecommunications system for creating and/or updating data concerning the radio propagation environment of a station of the telecommunications system, comprising:
  a first station;
  a second station for communicating by radio with the first station;
  means for defining the current geographical location of the first station by means of a source of location information that is external to the telecommunications system;
  determining means for determining a feature of a radio signal received by one of the stations from the other of the stations; and
  calculating means for calculating a parameter of the radio propagation environment by means of the determined current geographical location of the first station and the said determined feature.

The embodiments provide several advantages. Most importantly, the embodiments improve the accuracy and reliability of the location determination procedure. In addition, some of the embodiments enable use of fewer receivers for the location determination process, especially when sector antennas or sector base stations are used. The embodiments operate well for both stationary or almost stationary mobile stations (i.e. for stations which are not continuously moving or are moving only slowly) and for mobile stations in continuous move (even in a fast continuos move). The proposed implementations require significantly less parameters to be estimated than the prior art proposals.

BRIEF DESCRIPTION OF THE DRAWINGS

For a better understanding of the present invention and as to how the same can be carried into effect, reference will now be made by way of example to the accompanying drawings in which.

DESCRIPTION OF THE PREFERRED EMBODIMENTS

Figure 1:
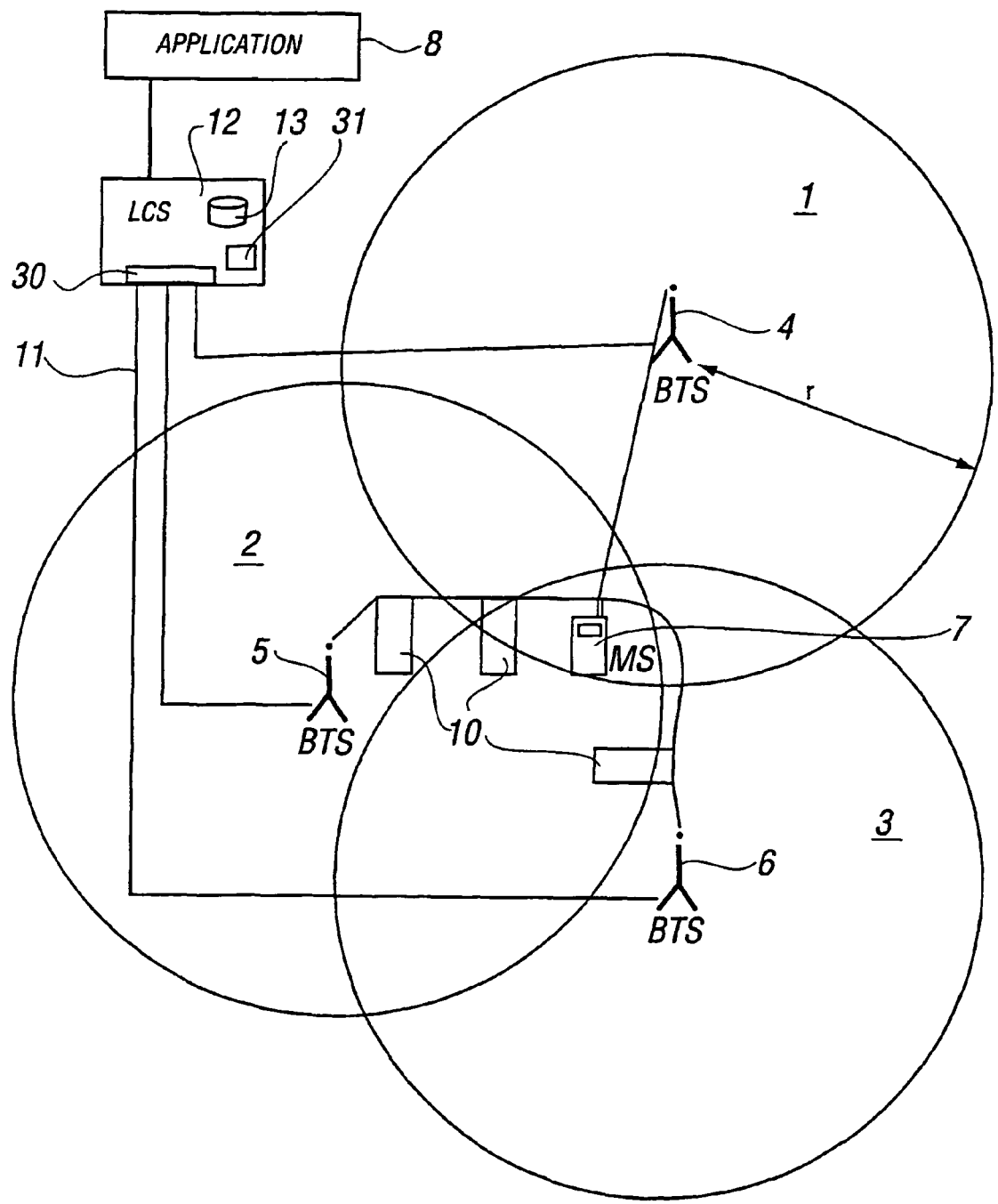
FIG. 1 shows a schematic diagram of three radio coverage areas of a cellular telecommunications system in which the embodiments of the invention can be implemented.

Reference will first be made to FIG. 1 in which three base stations provide omnidirectional radio coverage areas 1, 2 and 3 of a telecommunications network. It is noted that even though the exemplifying telecommunications network shown and described in more detail in the following uses the terminology of a GSM (Global System for Mobile communications) public land mobile network (PLMN), it should be appreciated that the proposed solution can be used in any system providing communications between a transmitting station and a receiving station. It should also be appreciated that even though FIG. 1 shows three base station coverage areas, the invention can be implemented using one, two or more than three coverage areas. The coverage areas 1, 2 and 3 can also be, instead of base station coverage areas, three cell coverage areas of mobile telecommunications network, wherein the coverage area of one cell can include more than one base station. It is also possible to group cells such that one coverage area comprises more than one cell (For example, URA (UMTS Terrestrial Radio Access Network Registration Area) consist of a group of cells).

Figure 2:
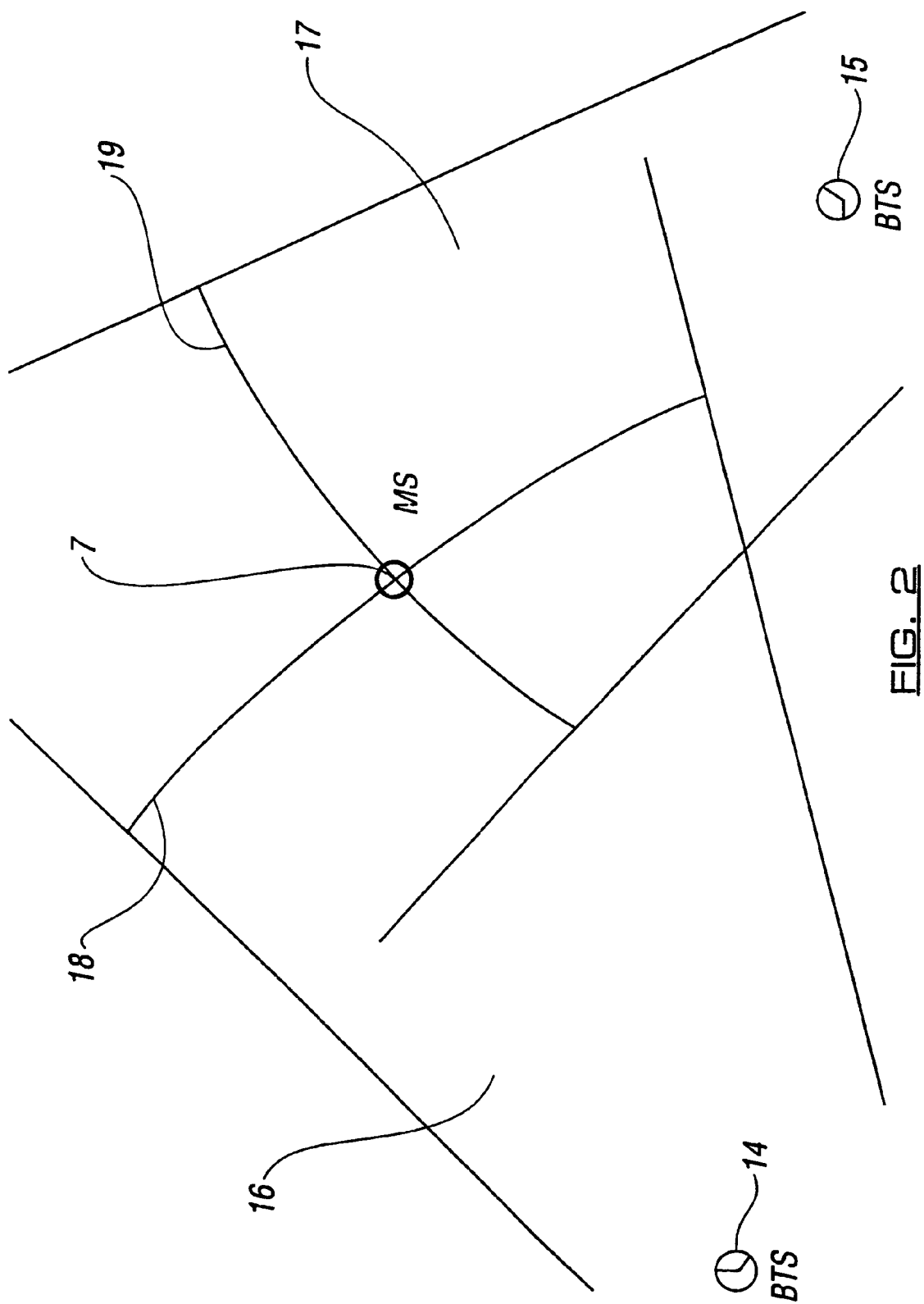
FIG. 2 shows two radio coverage areas provided by sector antennas.

FIG. 2 shows two radio coverage areas 16 and 17 which consist of sectors of base stations 14 and 15 provided with directional or sector antennas. The base stations may use e.g. three 120° directional antennas whereby three radio coverage areas are provided, or four 90° directional antennas providing four radio coverage areas and so on, or any combinations of different radio coverage beam widths.

In FIG. 1 each radio coverage area 1, 2 and 3 is served by the respective base transceiver station (BTS) 4, 5 and 6. More particularly, each base transceiver station BTS is arranged to transmit signals to and receive signals from the mobile station (MS) 7. Likewise, the mobile station 7 is able to transmit signals to and receive signals from the respective base transceiver station. The mobile station 7 is accomplishing this via wireless communication with the base stations. Typically a number of mobile stations will be in communication with each base station although only one mobile station is shown in FIG. 1 for clarity. Each of the base stations is connected to a respective network controller (not shown), which in the exemplifying GSM system is a Mobile Switching Center (MSC). It is noted that more than one base station can be connected to each controller. Typically more than one controller is also provided in a network. The controller is connected to other elements of the network via a suitable linking or gateway apparatus (not shown), such as Gateway Mobile Switching Center (GMSC) or a serving GPRS Support Node (SGSN).

The mobile station 7 is able to move from one coverage area to another coverage area. The location of the mobile station 7 may thus vary in time as the mobile station is free to move from one location (base station coverage area or cell coverage area) to another location (to another coverage area) and also within one coverage area.

Figure 3:
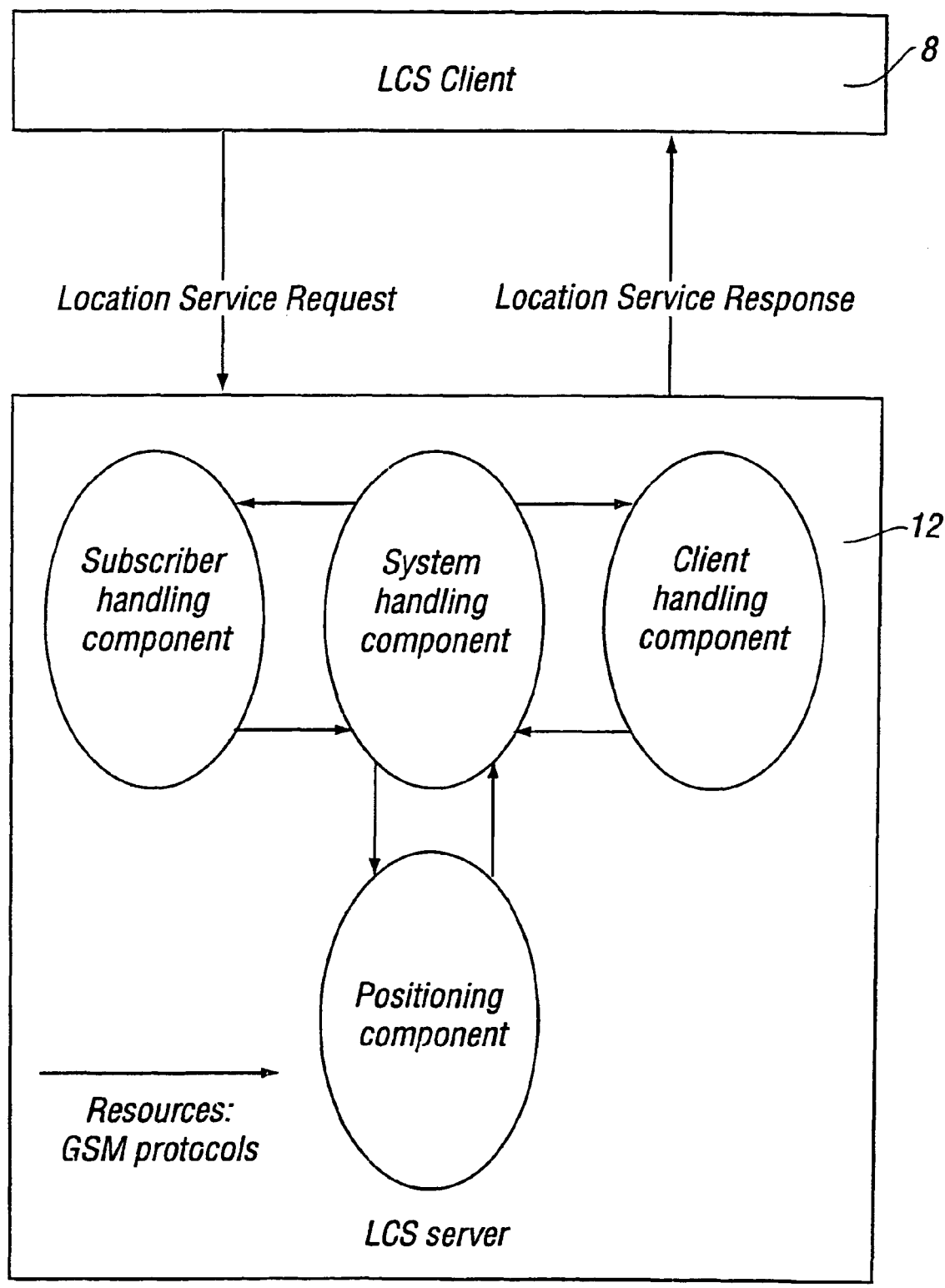
FIG. 3 illustrates one possible functional diagram for a location server.

FIG. 1 shows further a Location Services (LCS) node 12 providing Location (LC) services for different applications or clients 8 who are entitled to receive at least some degree of information concerning the location (or location history) of a mobile station. FIG. 3 illustrates in more detail one proposal according to ETSI (European telecommunications Standards Institute) technical specification "Location Services" (T1P1.5/99-048r4) for the functional diagram of the location server 12. In general terms, the LCS functionality can be defined as a feature capable of providing information concerning the location of the MS, and more particularly, the location defined on the basis of the position of the mobile station relative to the base station(s) of the mobile telecommunications network. The location server node is arranged to receive by receiving means 30 predefined information concerning the location of the mobile station 7 and to process this information and/or some other predefined parameters and/or to compute by processor means 31 appropriate calculations for determining and outputting the geagraphical location of the given mobile station 7. A more precise example of the calculations and possible parameters will be discussed later in this description. The location server 12 may also comprise a register or database 13 for storing radio coverage area specific data. This radio coverage area specific data can be alternatively stored in the base station itself or in the controller controlling the base station, wherefrom it is transmitted to the location server for the calculations. The data is received from the telecommunications system by receiving means 30. The creation and update of this data will be explained later in this description.

Even though not shown in detail, the LC node 12 can be connected by means of an appropriate interface to the network controllers (controllers omitted from FIG. 1 for clarity) controlling the base stations signalling with the MS 7. It is also noted that even though the LC node 12 can be a separate node from a network controller, it could also be a part or an internal component or functionality of a controller, or gateway controller or any other element of the telecommunications system.

The determination of the location of a mobile station can be based on measurements of at least one feature of the received radio signal. A feature which can be used in this is the time of arrival of the radio signal sent by the mobile station 7 at the base stations 4, 5 and 6. The travel time of the received signal at any particular base station is related to the distance traveled given by formula:

$$R=cT, \qquad [1]$$

wherein
   R=mobile to base station distance (range)
   c=the speed of light, and
   T=the travel time of the radio signal.

The location information can also be based on measurements accomplished at the receiving station to determine the signalling strength, signal to noise ratio or any other such feature of the received signal from which it is possible to determine the distance between the transmitting station and the receiving station. It is noted that the measurement of the feature of the radio signal can be accomplished in the uplink and/or in the downlink, i.e. at the base station end or at the mobile station end or both. In case the mobile station is used for the measurements of the signal feature, it can use the radio network for messaging the measurement results to an appropriate network element. The necessary location calculations and determinations based on various collected/defined data can be accomplished at the station (base station or the mobile station) or then at an appropriate network element having an access to all required data.

In an ideal situation illustrated by the three circles in FIG. 1 or two sectors 18 and 19 of a circle in FIG. 2 each distance measurement would generate a circle or a sector of a circle, respectively, centred at the measuring base station and having a radius r equal to the transmitting mobile station to receiving base station distance. In the absence of any measurement error, the intersection of the three circles in the FIG. 1 instance and intersection of the two circles in FIG. 2 instance would then unambiguously determine the accurate location of the mobile station 7.

However, as can also be seen from FIG. 1, in practice the situation will not be this straightforward due to blocking elements or obstacles 10. The obstacles 10 could be, for example, buildings and other large constructions, pillars, statues, trees, rocks, cars etc. elements between the base station and the mobile station. In addition to the possible obstacles in the radio coverage area of the base station in the radio propagation path between the transmitting station and the receiving station, a further variance in the path lengths is due the fact that the amount and nature of the obstacles may also vary from one radio coverage area or environment to another. For instance, the landscape can be different, buildings can be positioned in different directions and/or have a different shape, size and height, the base stations may be differently positioned and so on. In addition, the amount of excess path length depends also on the actual distance between the transmitting station and the receiving station.

In FIG. 1 the base station 4 has a direct or clear radio propagation path to the mobile station 7, while the base stations 5 and 6 are located such that the signalling from the mobile station 7 cannot directly reach the base stations. In other words, the mobile station 7 has lost the line of sight (LOS) with the base stations 5 and 6, and thus there will be an additional source of error to the excess path length the radio signal has to travel, as is shown by the lines between the respective base stations 5 and 6 and the mobile station 7. Due to reflection and diffraction, the first arriving wave may actually travel excess path lengths on the order of hundreds of meters if the direct path is blocked. Ultimately, this results in the biased estimate of the mobile station's location. The embodiments described in the following will address this non-line of sight (NLOS) problem.

Each radio coverage area can be given a predefined characteristic value or parameter characterising the different radio propagation environments and thus the different excess path lengths in each of the radio coverage areas. This value may depend on whether or not there are high buildings and/or big trees and similar obstacles in the area. The value can also depend on the quantity and/or type and/or location of the obstacles. Some possibilities for this parameter or several parameters as well as for defining the values for the parameters will be discussed later in this description.

According to one embodiment a weighted least square method can be used for calculating the location of a mobile station and thus the location of a subscriber. The used weighting matrix can be the inverse of an error covariance matrix. The covariance matrix and thus the weighting matrix will then depend on those values. It is also possible that the radio signal quality measures and some other parameters, such as an initial distance estimate, are included to estimate the variants of the measurement errors on different links.

The estimation of the covariance matrix can be based on the basic assumption that the errors are in most part caused by two components: a possible measurement error in the time difference and the excess path length caused by the obstacles in the signalling path. The following will discuss a theoretical derivation of this possibility for the location calculation as the embodiment using matrix calculations for the location determination is based on the implications of this derivation.

The squared distance between ith base station and the mobile station or terminal can be obtained from equation:

$$r_i^2 = (x_i-x)^2 + (y_i-y)^2 = K_i - 2x_i x - 2y_i y + x^2 + y^2 \quad [2]$$

where (x, y) and $(x_i, y_i)$ are the co-ordinates of the terminal and the ith base station, respectively, and $K_i = x_i^2 + y_i^2$.

In the location calculation one of the base stations (e.g. the strongest one) is selected as the reference base station, and all the range measurement results are presented in relation to this base station. The range differences between the terminal and different base stations can then be written as:

$$r_{i,1} = r_i - r_1 = c d_{i,1} \quad [3]$$

where c is the signal propagation speed, and $d_{i,1}$ is the measured received time difference of signals from ith base station and the reference base station. Writing equation [2] with help of equation [3] gives then:

$$r_{i,1}^2 + 2 r_{i,1} r_1 + r_i^2 = K_i - 2x_i x - 2y_i y + x^2 + y^2 \quad [4]$$

Subtraction of the term $K_1$ relating to the reference base station from equation [4] results to:

$$r_{i,1}^2 + 2 r_{i,1} r_1 = -2 x_{i,1} x - 2 y_{i,1} y + K_i - K_1 \quad [5]$$

In the following it is assumed that the range of the reference base station $r_1$ is already known (e.g. measured separately). For the location calculation all the measurements can be written with a matrix notation as:

$$\begin{bmatrix} x_{2,1} & y_{2,1} \\ \vdots & \vdots \\ x_{M,1} & y_{M,1} \end{bmatrix} \begin{bmatrix} x \\ y \end{bmatrix} = \begin{bmatrix} -\frac{1}{2} r_{2,1}^2 - r_{2,1} r_1 + \frac{1}{2} K_2 - \frac{1}{2} K_1 \\ \vdots \\ -\frac{1}{2} r_{M,1}^2 - r_{M,1} r_1 + \frac{1}{2} K_M - \frac{1}{2} K_1 \end{bmatrix} \Rightarrow A\bar{x} = \bar{b} \quad [6]$$

The location of the mobile station can then be calculated by solving this matrix equation, e.g. by using the least-squares method. The weighted least squares solution to this matrix equation is:

$$\bar{x} = (A^T W A)^{-1} A^T W \bar{b} \quad [7]$$

The weighting matrix W is preferably selected to be the inverse of the covariance matrix of the measurement errors. The derivation of the suitable weighting matrix can be carried out e.g. as follows:

Write the range difference estimate between ith and the first base stations as $$r_{i,1} = r_{i,1}^0 + e_{i,1} \quad [8]$$

where $r_{i,1}^0$ is the correct and exact range difference (i.e. the desired value) and $e_{i,1} = v_{i,1} + n_{i,1}$ is the error term including contributions both for the excess path length due to non-line-of-sight (v) and other measurement errors (n). The excess path lengths to different base stations are assumed to be independent, as well as the excess path length error and the other measurement errors. In addition the other measurement errors $n_{i,1}$ are assumed to be zero mean random variables.

By replacing equation [8] in equation [6] and carrying out some algebra we obtain an expression for the error term $\bar{b}_e$ in the location calculation:

$$A\bar{x} = \bar{b}^0 - \bar{b}_e \quad [9]$$

$$\bar{b}_e = \begin{bmatrix} -r_1^0 & r_2^0 & 0 & \cdots & 0 \\ -r_1^0 & 0 & r_3^0 & \cdots & 0 \\ \vdots & \vdots & \vdots & \ddots & \vdots \\ -r_1^0 & 0 & 0 & \cdots & r_M^0 \end{bmatrix} \begin{bmatrix} e_1 \\ e_2 \\ \vdots \\ e_M \end{bmatrix} + \frac{1}{2} \begin{bmatrix} e_2^2 - e_1^2 \\ e_3^2 - e_1^2 \\ \vdots \\ e_M^2 - e_1^2 \end{bmatrix} =$$

$$M\bar{e} + \frac{1}{2} \begin{bmatrix} e_2^2 - e_1^2 \\ e_3^2 - e_1^2 \\ \vdots \\ e_M^2 - e_1^2 \end{bmatrix}$$

where $\bar{b}^0$ is the exact measurement vector in equation [6], and $e_j$ is the error term for the range measurement to the jth base station.

Next, the mean and variance of the error term $\bar{b}_e$ are calculated. In their derivation the second order error term can be neglected, meaning that it is assumed that the location estimation error is significantly smaller than the range between the terminal and the base station. This choice was made for simplicity of presenting and interpreting the results. For example, in urban environment where the cells are small and excess path lengths due to non-line-of-sight propagation can be relatively large, it may be that this assumption does not always hold very well in all possible non-line-of-sight situations, and thus the second order terms has to be taken into account in the calculations.

The mean value of the error term obtained by utilizing the above-defined assumptions is:

$$E\{\bar{b}_e\} = E\{M\bar{e}\} = \qquad [10]$$

$$M(E\{\bar{v}+\bar{n}\}) = M(E\{\bar{v}\}+E\{\bar{n}\}) = ME\{\bar{v}\} = M\begin{bmatrix}\mu_{v_1}\\\mu_{v_2}\\\vdots\\\mu_{v_M}\end{bmatrix} = M\mu_v$$

where $\mu_v$ is the mean vector of the excess path delays. The covariance matrix of the error term is then:

$$C = E\{\bar{b}_e\bar{b}_e^T\} - E\{\bar{b}_e\}E\{\bar{b}_e\}^T = E\{M\bar{e}\bar{e}^TM^T\} - M\mu_v\mu_v^TM^T \qquad [11]$$

$$= M(E\{\bar{v}\bar{v}^T\}+E\{\bar{n}\bar{n}^T\}-\mu_v\mu_v^T)M^T = \ldots$$

$$= M * diag$$

$$\left(\sigma_{v_1}^2 + \sigma_{n_1}^2 - \mu_{v_1}^2 \quad \sigma_{v_2}^2 + \sigma_{n_2}^2 - \mu_{v_2}^2 \quad \ldots \quad \sigma_{v_M}^2 + \sigma_{n_M}^2 - \mu_{v_M}^2\right)M^T$$

$$= MDM^T$$

where $\sigma_{v_j}^2$ is the variance of the excess path length due to non-line-of-sight connection between the mobile station and jth base station, and $\sigma_{n_j}^2$ is the variance of the measurement information. diag means a diagonal matrix which is written as D in the last line of the derivation.

Now, while calculating the terminal or mobile station location within the cellular system by using equation [6], the following can be used as the weighting matrix (or an approximation of it):

$$W = C^{-1} = (MDM^T)^{-1} \qquad [12]$$

Alternatively it is possible to use the more complicated result obtained when the second error term in equation [9] is not neglected (this does not affect in the continuation as the same quantities are required in the actual calculations).

In the above the matrix M consists of the measured ranges between the mobile station and base stations. These, or their corrected (debiased) values, are to be used directly in the calculations. $\sigma_{n_j}^2$ depend on the SNR (signal to noise ratio) of the connection. It will also depend on the accuracy of the method used for time delay estimation, but that is the same for all connections. The estimated SNR value is to be mapped to a suitable value for calculations or a fixed number is to be included if the SNR is not estimated for the connection. $\sigma_{v_j}^2$ and $\mu_{v_j}$ will, in turn, mostly depend on the radio propagation environment within the coverage area of a specific base station.

The proposed solution enables an use of these information parameters $\sigma_{n_j}^2$, $\sigma_{v_j}^2$, and $\mu_{v_j}$ discussed above such that the values thereof do not need to be extremely accurate. For example, only few different levels or classes may be enough (e.g. 5 levels: excellent, good, passable, bad, horrible corresponding to some predefined values). In other words, the different radio coverage areas can be divided in different classes. In a practical implementation class A could, for example, indicate that the amount of hinders in the line of signal propagation is almost zero. Class B would then indicate slightly more hindered signalling path, class C more hindered path and so on until the last class or category would indicate that there is an extremely heavy non-line of sight signal propagation case. In addition to these "quality" parameters of the line-of-sight conditions of the radio coverage area, some other characteristic parameters can be used, such as an estimate of the distance between the mobile and base stations. These values can also be divided in different classes or categories in accordance with predefined definitions.

Appropriate values for the individual parameters for each base station can be defined e.g. during network planning phase, or later by some appropriate means for determining and storing them in a network element processing the actual location calculations, for example, in the LCS server 12 of FIGS. 1 and 3. These methods and/or appropriate apparatus for this will be discussed in more detail later. The individual, radio coverage area specific parameters can be considered to be substantially stable, and they need to be updated only when some significant changes occur in the radio propagation environment (new buildings or other blocking constructions are built in or buildings are pulled down, position and/or number and/or structure of the transceivers is modified etc.).

In addition to the above mentioned classification, appropriate methods for detecting line-of-sight/non-line-of-sight situation can also be utilized. Then, when line-of-sight (no excess path length, cf. cell 1 in FIG. 1) situation is detected, these above quantities can be set to a predefined value.

Figure 5:
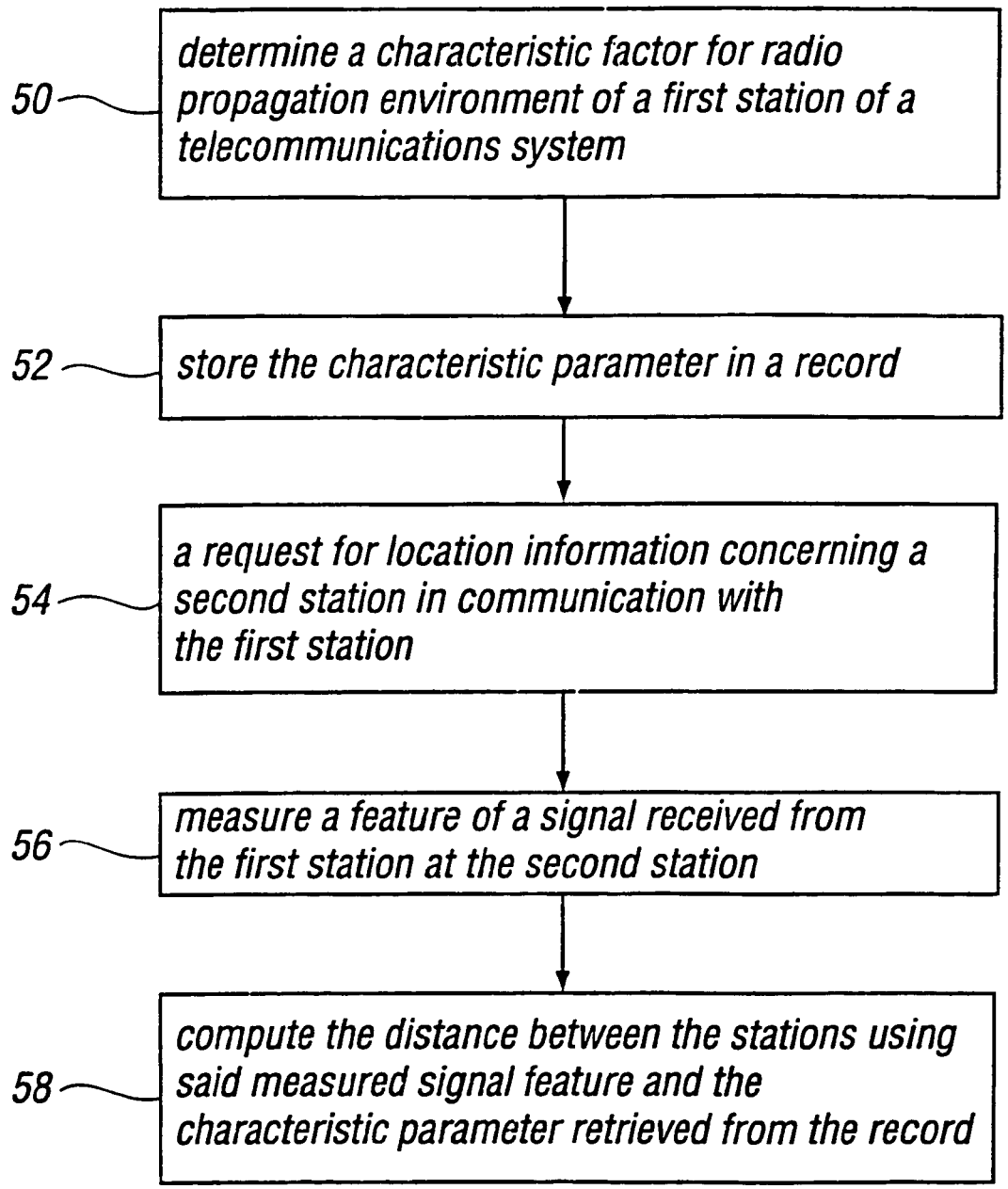
FIG. 5 is a flow chart for operation in accordance with one embodiment.

As discussed above, a basic data for the radio propagation environment for the different radio coverage areas has to be created before a characteristic parameter or several parameters describing the radio propagation environments in the different radio coverage areas can be determined and stored in the system (steps 50 and 52 in the flow chart of FIG. 5). The determination and/or creation of the basic data for the radio propagation environment for a specific area can be accomplished in various manners. One method is to measure the characteristic radio propagation environment for each radio coverage area of the system by a suitable radio propagation environment measurement and determination device. According to another approach, on-site estimations based on visual determination of the radio propagation environment can be accomplished, and then this information is used as a base for the characteristic parameter(s). The determination can also be accomplished remotely, e.g. by studying maps and similar topographical information of the area and including any buildings, streets and similar characteristic information of the radio coverage area into the estimate. Telecommunications network planning tools can be provided with a feature which models the radio coverage areas and produces the characteristic parameters for each of the areas. It is also possible to combine one or several different determination methods in order to obtain more reliable and accurate parameters.

Figure 4:
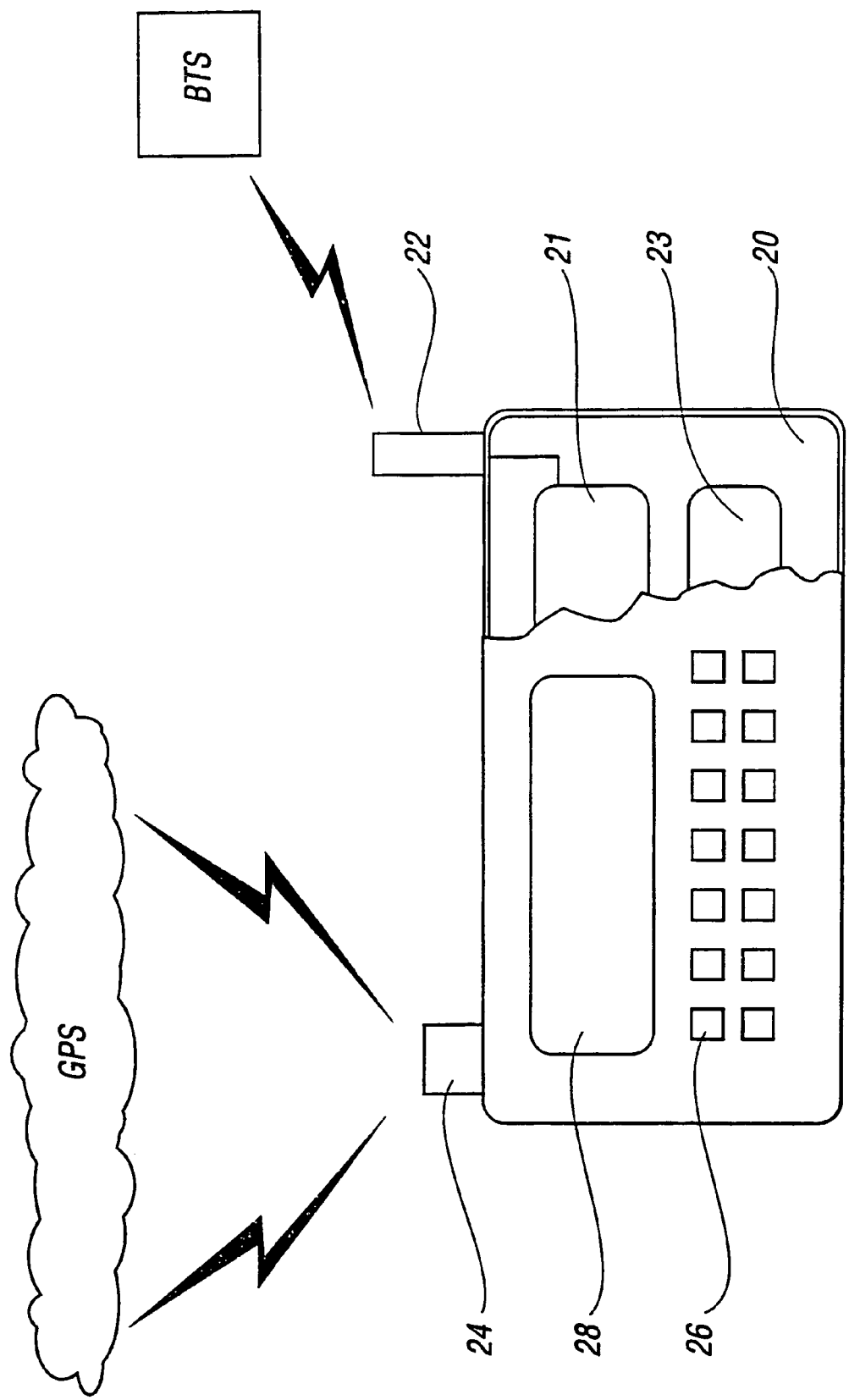
FIG. 4 shows a partially sectioned view of an apparatus for use in creating/updating parameters used for providing the location information.

FIG. 4 discloses one embodiment of an apparatus for use in creating and/or updating the basic data for the characteristic parameter or parameters for different radio coverage areas. An essential feature of the radio propagation data generating is that the used apparatus is capable of combining the actual geographic location information with a predefined signal feature (or several properties) for the radio traffic between the examined station and the device 20 and creating a dependency between the geographical location and the feature of the signal. This computing can be done by a processor 23 of the device 20, or then it can be accomplished at one of the network elements, such as the processor 31 of the location server 12 of FIG. 1.

The geographical location is preferably obtained from a reliable external source, e.g. from the well known GPS (Global Positioning System). The GPS is a satellite based system used in military and civil applications when ever accurate positioning is required, e.g. for the purposes of navigation. A more accurate location information can be obtained through a differential GPS. In addition to the GPS, any other similar system capable of providing reliable location information to the device 20 can be used for this.

The basic data creating apparatus 20 is shown to comprise a an antenna 24 for receiving the location signals from the GPS satellites or similar system. These signals are used by the apparatus 20 in determining the current position of the apparatus 20 in a per se known manner. This determination can be accomplished by the processor 23, or then the device may have separate determination means for this task. According to one alternative the user of the device 20 inputs manually precise location coordinates (e.g. in altitudes and latitudes, or by using street names or similar established address information), e.g. by means of the keyset 26, a voice recognition device, or similar input interface.

The device 20 of FIG. 4 is provided with another antenna 22 for transmitting radio signals to and/or receiving radio signals from the base station BTS under examination in a manner similar to an actual mobile station using the mobile telecommunications system for communication. The radio propagation environment, and thus the required parameters for the location determination, can be determined from the signalling between the device 20 and the base station in several alternative manners. According to one approach, the determination is accomplished at the device 20 by determination means 21 based on the signals transmitted from the base station BTS and received at the device 20. The assumption is that the signals propagate in a substantially similar manner in both directions between the mobile station and the base station. According to another scenario, the device 20 receives an message from the base station including results of a measurement accomplished by the base station as response to a test signal sent by the device 20 to the base station. By means of this kind of arrangement it is possible to avoid any errors caused by a possible difference in the transmission paths in different directions. According to a further possibility, the base station BTS receives a test signal from the device 20 together with a location information defined by the device 20. After having measured/determined the predefined signal feature, the base station sends a message to the location server or any other networks element arranged to handle the measurement results the message containing the location of the device 20 and the results of the signal feature measurements. This information can then be used in determining the characteristic parameter for the radio propagation environment for the particular base station under examination in an appropriate network element, such as the server 12 of FIG. 1.

The device 20 can interface the location server 12 of FIG. 1 in several alternative manners. Since it is capable of establishing a radio communication with the base station of the used telecommunications system, it may well use this radio interface also for transmitting any messages and information to the location server or any other appropriate network element. The interface can also be a specific infrared or short range radio connection (such as a "bluetooth" connection) or a fixed connection using e.g. appropriate plugs and sockets or cabling between the device 20 and the location server. The user may use storage device, such as a diskette, a magnetic tape or a hard disk or similar means providing storage facility, from which the data is read later on. One possibility is that the user of the device 20 simply writes down on to a paper any parameters shown by the display 28.

The device 20 can be used for both creating and updating the radio location area specific data. When updating the data, it can be enough that the device compares the results with the old data. The data stored in the location server or similar facility is then updated only if the device 20 detects changes in the radio propagation environment which require update of the data in the register of the location server.

It is also possible that some mobile users may be provided with mobile stations that monitor the radio propagation environment. More particularly, some of the mobile users may have mobile stations they can use in a normal manner but which are also provided with the location determination functionality of the device 20 of FIG. 4. The arrangement can be automatic such that the data stored e.g. in the register 13 of the server 12 is updated automatically (adaptively) whenever any of the portable devices 20 or the mobile telephone provided with the functionalities of the device 20 notes such a change which requires an update. The monitoring may occur continuously, periodically, randomly etc.

It should be appreciated that whilst embodiments of the present invention have been described in relation to mobile stations of a mobile telecommunications system, embodiments of the present invention are applicable to any other suitable type of user equipment of other types of systems providing location functionality. These system include satellite based communication systems as well as satellite based location systems.

The data can be transmitted between the various network element in packet form. In alternative embodiments of the invention the data may be sent in any suitable format.

The embodiment of the present invention has been described in the context of a TDMA system. This invention is also applicable to any other access techniques including frequency division multiple access (FDMA) and code division multiple access (CDMA) as well as any hybrids thereof. It should also be appreciated that base stations can sometimes be referred to as node B.

It is also noted herein that while the above describes one exemplifying embodiment of the invention, there are several variations and modifications which may be made to the disclosed solution without departing from the scope of the present invention as defined in the appended claims.

The invention claimed is:

1. A method comprising:
   determining a characteristic parameter describing line-of-sight conditions of a radio propagation environment of at least for two base stations in a mobile telecommunications system, wherein the characteristic parameter describes excess path lengths caused by obstacles in the environment by means of one of a number of discrete levels;
   measuring at least one feature of a signal transmitted between a mobile station and the at least two base stations, the feature being such that it can be used for determination of distances between the mobile station and the two base stations; and
   computing the distances between the mobile station and the two base stations using the measured signal feature and the characteristic parameter describing the line-of-sight conditions of the at least two base stations; and
   determining a current geographical location of the mobile station based on the determined distances between the mobile station and the at least two base stations; wherein the at least one feature comprises at least travel time or travel time difference of the signal between the mobile station and the at least two base stations.

2. A method according to claim 1, wherein the at least one feature comprises at least signal travel time differences between the mobile station and the at least two base stations.

3. A method according to claim 1, comprising use of a weighted least square method for determination of distances between the at least two base stations and the mobile station, wherein the used weighting matrix is the inverse of an error covariance matrix.

4. A method according to claim 1, comprising:
defining radio propagation environments for several stations; and
classifying the stations in different radio propagation environment classes;
wherein the characteristic parameter is based on the class of the station.

5. A method according to claim 1, wherein the data for the characteristic parameter is stored and processed in a location service node implemented in the mobile telecommunications system.

6. A method according to claim 1, wherein the determining the characteristic parameter comprises:
determining the current geographical location of the mobile station in a way that is external to the telecommunications system; and
inputting the results of the determination to the mobile telecommunications system.

7. A method according to claim 6, comprising use of a satellite based positioning system for the determining the current geographical location of the mobile station.

8. A method according to claim 1, wherein the signal is transmitted from the two base stations to the mobile station and the signal is measured at the mobile station.

9. A method according to claim 1, wherein the signal is transmitted from the mobile station to the two base stations and the signal is measured at the two base stations.

10. Apparatus, comprising:
storage device for storing a characteristic parameter describing line-of-sight conditions of a radio propagation environment for at least two base stations,
wherein the characteristic parameter describes excess path lengths caused by obstacles in the radio propagation environment by means of one of a number of discrete levels;
measurement device for measuring a feature of a signal transmitted between the mobile station and the at least two base stations for determination of distances between the mobile station and the at least two base stations; and
a controller for receiving an outcome of the measuring for defining the distances between the mobile station and the at least two base stations based on the outcome of the measuring and the characteristic parameter, and for determining a current geographical location of the mobile station based on the determined distances between the mobile station and the two base stations;
wherein the feature of the signal is based on travel time or travel time difference of the signal between the mobile station and the at least two base stations.

11. The apparatus according to claim 10, wherein different radio propagation environments of different stations are classified in different radio propagation environment classes and the characteristic parameter is based on the class of the station.

12. The apparatus according to claim 10, wherein the mobile station comprises a sector antenna.

13. An arrangement according to claim 10, wherein the signal is transmitted from the at least two base stations to the mobile station and the signal is measured at the mobile station.

14. An arrangement according to claim 10, wherein the signal is transmitted from the mobile station to the at least two base stations and the signal is measured at the two base stations.

15. A location server for use in a telecommunications system for provision of location data of a mobile station having a radio connection with at least two base stations of the telecommunications system, comprising:
means for receiving measurement data from the telecommunications system concerning a feature of the connection between the mobile station and the at least two base stations for determination of distances between the mobile station and the at least two base stations;
storage means for storing a characteristic parameter describing the line-of-sight conditions of the radio propagation environment of for the two at least two base stations, wherein the characteristic parameter describes excess path lengths caused by obstacles in the environment by means of one of a number of discrete levels;
control means for defining the distances between the mobile station and the at least two base stations on the basis of the received measurement data and the characteristic parameter and for determining a current geographical location of the mobile station based on the determined distances between the mobile station and the at least two base stations;
wherein the feature of the connection is based on travel time or travel time difference of the signal between the mobile station and the at least two base stations.

16. An arrangement, comprising:
a first station in a telecommunications system;
a second station for communicating by radio with the first station in the telecommunications system;
the arrangement configured to define a current geographical location of the first station with a source of location information that is external to the telecommunications system, to determine a feature of a radio signal received by one of the stations from two other stations, and to calculate a parameter describing line-of-sight conditions of a radio propagation environment according to the current geographical location of the first station and the determined feature, wherein the parameter describes excess path lengths caused by obstacles in the environment with one of a number of discrete levels;
wherein the feature of the radio signal is based on travel time or travel time difference of the signal between the station and the other stations.

17. An arrangement according to claim 16, configured to receive signals from a satellite based positioning system.

18. An arrangement according to claim 16, configured to determine if an update of the data concerning the radio propagation environment is required.

19. An arrangement according to claim 16, wherein the first station comprises a portable device.

* * * * *